United States Patent [19]

Bieser

[11] 4,211,160
[45] Jul. 8, 1980

[54] METHOD AND APPARATUS FOR INTERNALLY SEASONING MEAT PRIOR TO COOKING

[76] Inventor: Dennis W. D. Bieser, Box 144, R.F.D. 2, Iola, Wis. 54945

[21] Appl. No.: 912,246

[22] Filed: Jun. 5, 1978

[51] Int. Cl.² ............................ A23B 4/02; A23L 1/22
[52] U.S. Cl. ......................................... 99/494; 99/532; 222/362; 222/386
[58] Field of Search .......... 99/345, 494, 516, 532–536; 17/25; 30/128; 222/386, 510, 362, 365

[56] References Cited

U.S. PATENT DOCUMENTS

| | | | |
|---|---|---|---|
| 390,170 | 9/1888 | Humaston | 99/494 |
| 609,799 | 8/1898 | Flinn | 99/494 |
| 1,071,063 | 8/1913 | Lee | 222/510 |
| 2,110,263 | 3/1938 | Dziedzic | 99/532 |
| 2,887,035 | 5/1959 | De Seversky | 99/494 |
| 3,241,477 | 3/1966 | Jenner | 99/345 |

Primary Examiner—Harvey C. Hornsby
Assistant Examiner—Timothy F. Simone
Attorney, Agent, or Firm—Clarence A. O'Brien; Harvey B. Jacobson

[57] ABSTRACT

A method and apparatus for inserting solid spices and liquid spices into the interior of meat for seasoning prior to cooking. The apparatus are disclosed comprises a reservoir for holding the spices, a tapered meat-piercing rod inserted into the interior of meat by application of pressure from a tube containing a measured amount of spices. After reaching the desired depth, the tapered rod is withdrawn, leaving the spices in the meat, and the tube is recharged with spices for repetition of the injection process. Injecting pressure can be exerted on the tapered rod by a handle acting against spring bias means, or by compression of a trigger and handle apparatus.

12 Claims, 13 Drawing Figures

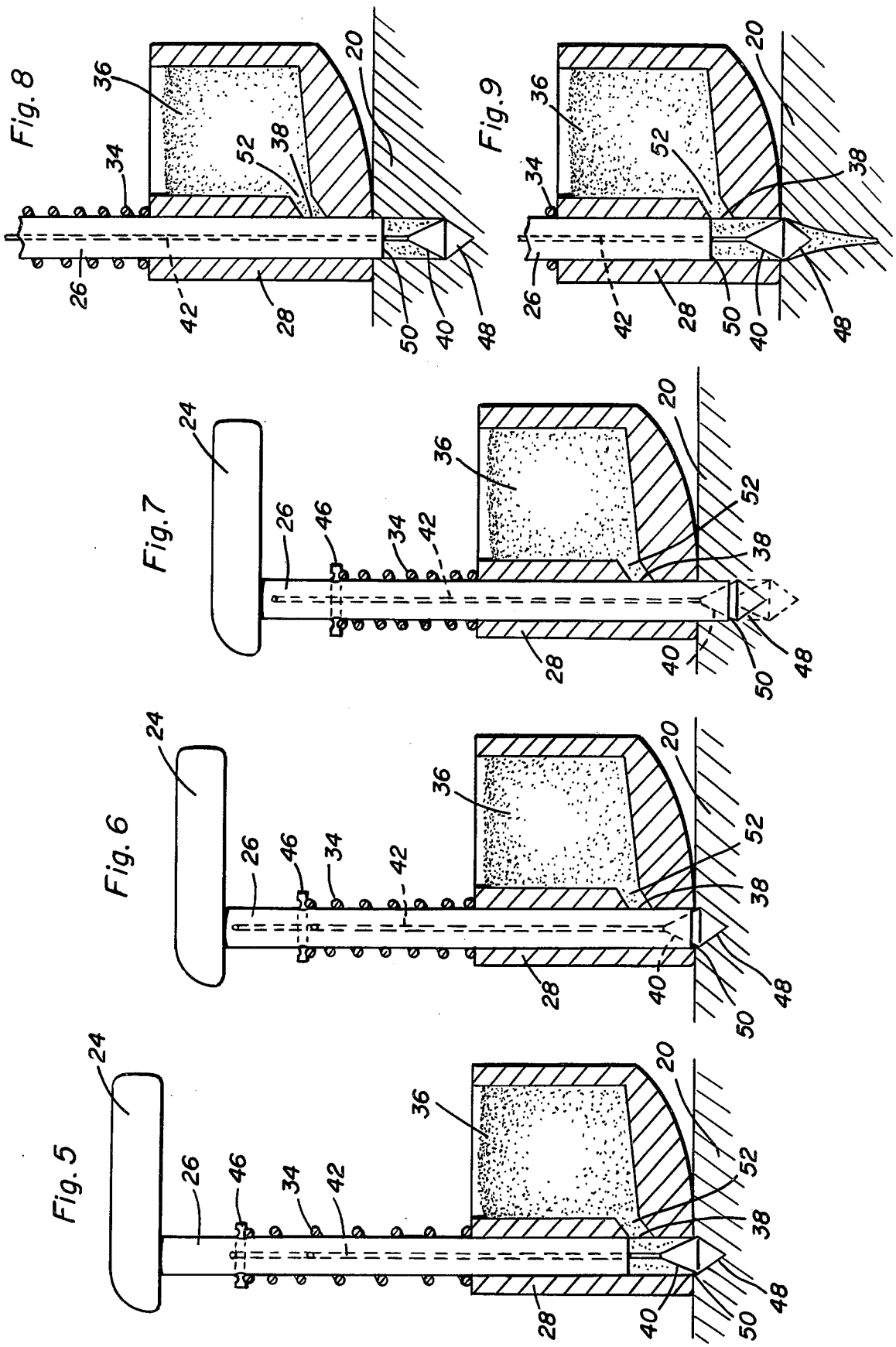

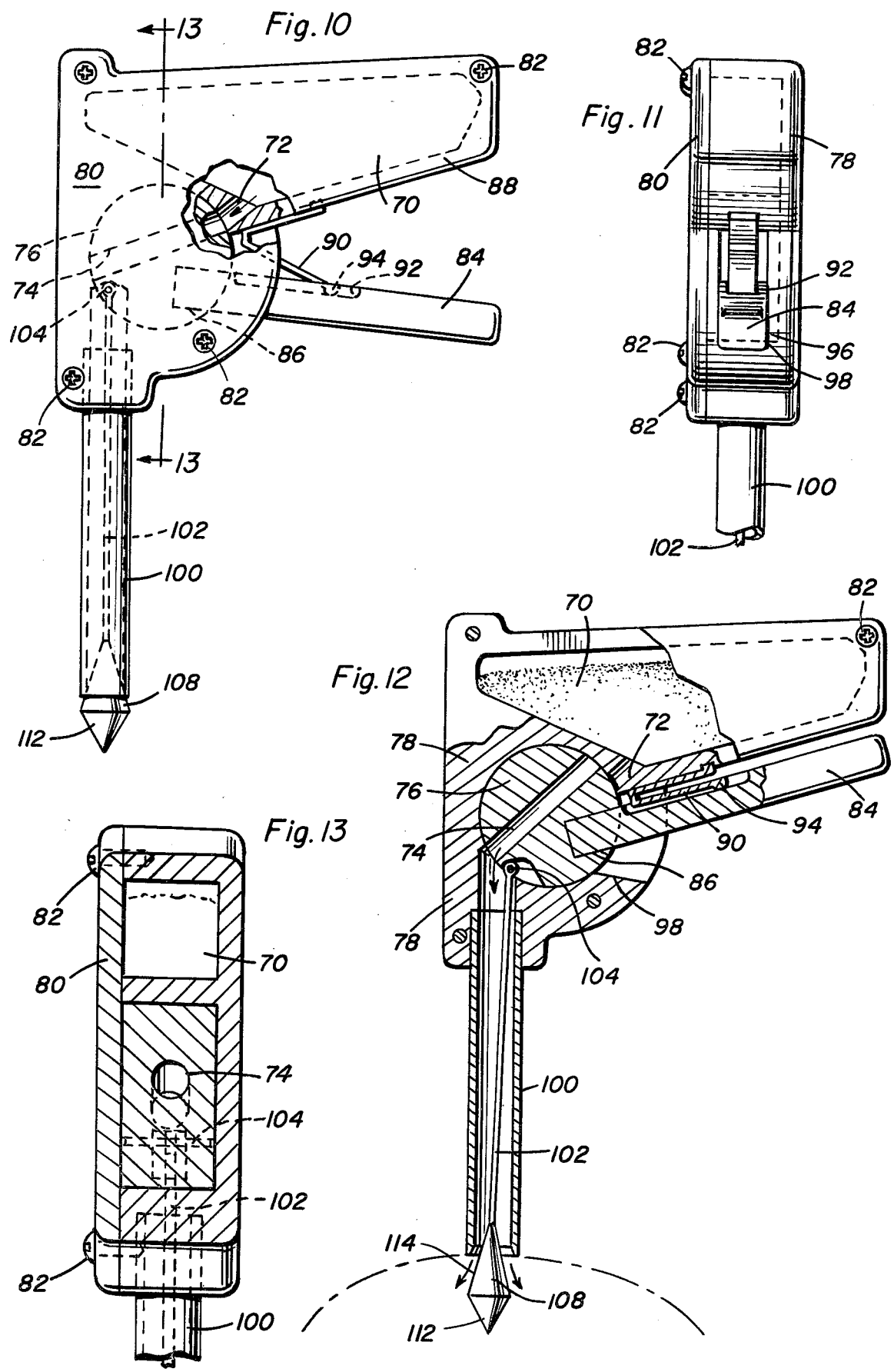

METHOD AND APPARATUS FOR INTERNALLY SEASONING MEAT PRIOR TO COOKING

BACKGROUND OF THE INVENTION

1. Field of the Invention

The invention relates to food seasoning apparatus, more particularly, to a device for internally injecting liquid or solid seasoning into meat prior to cooking. Two embodiments of the apparatus are disclosed, one involving exerting direct pressure on a meat injecting rod, and another involving squeezing of a trigger and handle combination. A method for internally seasoning meat with the apparatus of the present invention is also disclosed.

2. Description of the Prior Art

Food seasoning devices are known in the prior art. U.S. Pat. No. 2,887,035 to DeSeversky shows a food seasoning injection device in which a hopper holds solid seasoning and tapers to a cylindrical section through which projects a piercing tube for inserting a part of the solid seasoning into meat, and the like. A problem with devices such as that of DeSeversky is plugging of the piercing or containing tube with meat on downward motion of the piercing tube. Furthermore, excessive pressure is required to force the piercing tube into the meat. These problems are overcome by the specific structure of the apparatus of the present invention when operated according to the method of the present invention.

Injecting devices for a different purpose are shown in U.S. Patents to Davis (No. 2,761,305), Sundholm (No. 3,286,887), and Moline (No. 3,717,222). Davis shows a device for injecting and compacting material into openings in concrete, brick, stone or other masonry, drawing material from a reservoir by means of a tamping rod into a fissure or opening. No means for creating the fissure or opening, however, are apparent from the device of Davis. Sundholm and Moline both show dispensing apparatus for applying grease, or the like, using a plunger assembly and nozzle. None of these three patents, however, provides means for penetrating into the interior of meat and none could be expected to properly dispense seasoning materials within the interior of a meat product.

Other patents showing the state of the prior art are the following:

U.S. Pat. Nos. 2,188,976—May 31, 1938—Larkin
2,384,429—Sep. 11, 1945—Ball
2,784,682—Mar. 12, 1957—Clevenger.

SUMMARY OF THE INVENTION

Problems encountered in properly seasoning meat for cooking are overcome in the present invention by insuring that seasoning is inerted within the interior of the meat efficiently without loss of seasoning material.

The invention in the preferred embodiment provides a rod with a tapered portion for inserting, along with a measured quantity of seasoning, into meat to be seasoned. Retraction of the tapered rod portion allows a further quantity of seasoning to automatically recharge the unit for repetition of the cycle.

It is accordingly an object of the present invention to provide apparatus for injecting solid or liquid seasoning into the interior of food, particularly meat products.

Another object of the invention is to provide a retractable tube and tapered rod which acts as a seasoning retaining means, as well as closeable opening, when the device is not being used to season meat.

A further object of the invention is to provide a device with a detachable reservoir portion, in order to permit convenient interchange of reservoirs holding different seasoning mixtures.

Still another object of the invention is to provide a device for injecting seasoning without the likelihood of plugging of the portion of the device contacting the food being seasoned.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is a vertical sectional view of the same embodiment, showing the handle in its fully retracted position as a quantity of seasoning is loaded for insertion in meat.

FIG. 6 shows the same device immediately prior to the start or insertion in the meat.

FIG. 7 shows the same device after insertion of seasoning in the meat (shown in broken outline), or after insertion to a shallower depth (shown in solid outline).

FIG. 8 is a fragmental, sectional view of the same device as retraction of the tapered rod is about to begin.

FIG. 9 is a fragmental, sectional view of the same device after retraction of the tapered rod has been completed and filling of the next charge of seasoning has taken place.

FIG. 10 is a side, elevational view, partly in section, of a second embodiment of the present invention, operated by compression of an associated trigger and handle.

FIG. 11 is a right end view of the second embodiment of the present invention.

FIG. 12 is a side, elevational view, partly in section, showing the device of the second embodiment with the tapered rod inserted in a mass of meat.

FIG. 13 is a side, sectional view of the second embodiment, taken substantially upon a plane passing along section line 13—13 of FIG. 10 and showing details of the operating mechanism.

DETAILED DESCRIPTION OF THE PREFERRED EMBODIMENTS

The present invention provides for injecting seasoning, such as salt, pepper, tenderizer, garlic powder, and other condiments or seasoning materials into the interior of meat roasts, steaks, or the like. When seasoning is sprinkled on the surface of meat, a considerable amount of seasoning is generally carried away from the surface of the meat by juices which form during cooking. However, when such seasonings are placed within the meat, the seasoning can spread throughout the meat by juices formed during cooking, and the juices are retained inside the meat to promote a juicy, evenly flavored roast, or other form of cooked meat. The present invention fills a need felt over a long time span and well recognized in the cooking art for a device which can conveniently and efficiently place and distribute meat seasoning internally prior to cooking.

Figure 1:
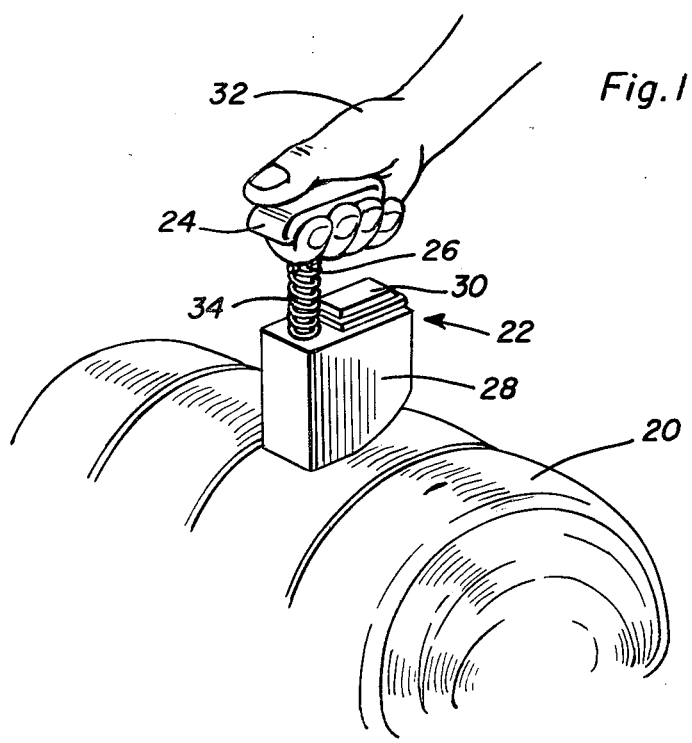
FIG. 1 is a perspective view of the first embodiment of the present invention when in use for seasoning a boneless roast.

In the embodiment of the present invention, shown in FIG. 1, a quantity of meat, such as a boneless roast shown in FIG. 1 and designated by the numeral 20 is contacted by seasoning device 22, comprising handle 24, tube 26 embedded in handle 24, body portion 28, and cover 30. The device 22 is shown with handle 24 depressed by hand 32 of an operator as seasoning is injected into meat 20. Spring 34 is under compression, opposing the downward motion of hand 32. Upon release of handle 24, spring 34 will push handle 24 upwardly, and device 22 can then be moved to a different location on meat 20 for repetition of the seasoning injection process.

Figure 2:
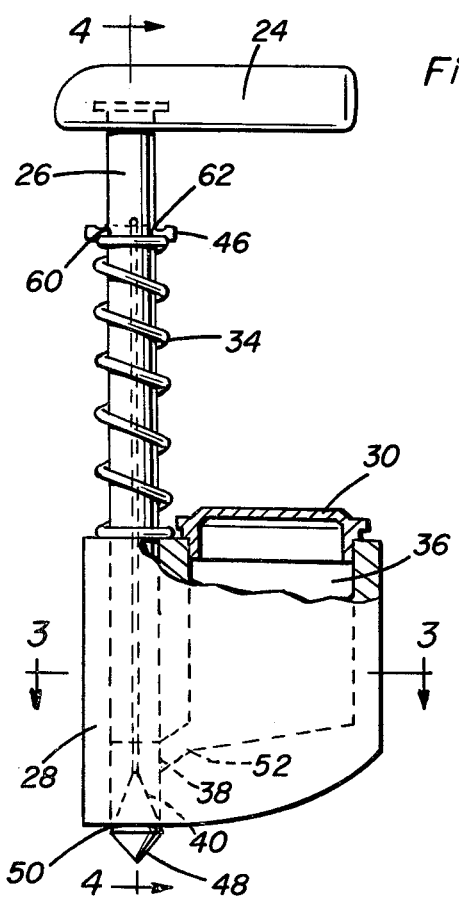
FIG. 2 shows a side elevational view of the same embodiment of the invention, partly in section.
Figure 4:
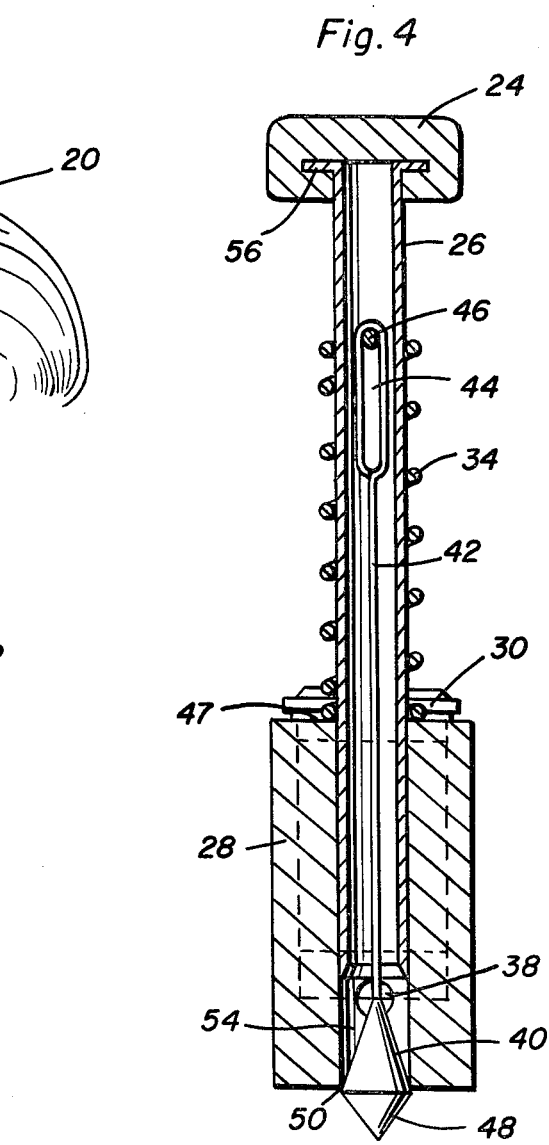
FIG. 4 is a vertical sectional view taken substantially upon a plane passing along section line 4—4 of FIG. 2, showing the same embodiment of the invention.
Figure 3:
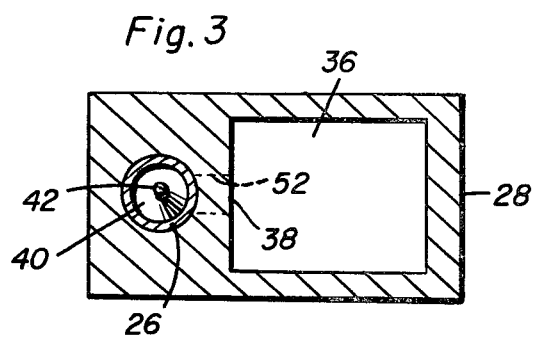
FIG. 3 shows a sectional plan view of the same embodiment, taken substantially upon a plane passing along section line 3—3 of FIG. 2, showing the relationship of the reservoir and plunger assembly.

Referring now to FIGS. 2, 3 and 4, showing internal details of the device, reservoir 36 is filled with an appropriate seasoning material, such as salt, tenderizer, other appropriate condiments, or mixtures thereof, and opens at opening 38 immediately above upper surface 40 of rod 42. The upper end of rod 42 is shaped with slot 44, through which retaining pin 46 passes. Downward motion of handle 24 causes spring 34 to be compressed between retaining pin 46 and the upper surface 47 of body 28, while forcing rod 42 downward, closing opening 38 by passage of tube 26 over opening 38 and then driving the pointed surface 48 of rod 42 into the meat (See FIGS. 5–8). Seasoning within tube 26 above upper surface 40 of rod 42 can flow out of bottom of body portion 28 and into the meat when handle 24 is released. Retraction of tube 26 opening 38 allows flow of seasoning from reservoir 36 through passageway 52, through opening 38 and into the region 54 above upper surface 40 of rod 42 which has also moved to closed position in relation to the opening 50 in the bottom of body portion 28 (See FIGS. 8 and 9). The device can then be reused at another location on the surface of the meat being internally seasoned.

Flange 56 of tube 26 facilitates retention of tube 26 on handle 24. It is to be noted that reservoir 36 is easily detachable by means not shown in FIGS. 1 through 4, thereby permitting easy replacement with a different reservoir having a different seasoning, or, alternatively, permitting easy change of the contents of reservoir 36 and replacement of the same reservoir with a new seasoning mixture. Furthermore, reservoir 36 can be constructed in a shape to permit presently manufactured seasoning containers to be used directly as reservoirs with the present invention. Such an adaptation is valuable when different kinds of meat are being simultaneously seasoned, or when mixing of more than one seasoning ingredient is not desirable. It is further to be noted that reservoir 36 and the mode of delivery of seasoning to meat 20 permits use of seasoning mixtures in liquid form, as well as solids. Accordingly, salt solutions, solutions of tenderizer, and suspensions of non-soluble seasoning ingredients can be easily introduced into meats. Such a manner of introduction can prevent problems of plugging, control of quantities of seasonings introduced, and portion regulation when large quantities of meat are under preparation.

A cycle of operation of the embodiment of the present invention is illustrated in FIGS. 5 through 9, showing steps in the sequence of operation where a solid seasoning composition in chopped or comminuted form is introduced into a mass 20 of meat. In FIG. 5, a quantity of seasoning from reservoir 36 has descended through passageway 52 and opening 38 into the region above upper surface 40 of rod 42. Spring 34 exerts upward pressure through retaining pin 46 to tube 26 and rod 42. In FIG. 6, handle 24 has been forced downwardly and tube 26 has closed opening 38 and retaining pin 46 now begins to move rod 42 by engaging the lower portion of slot 44. In FIG. 7, the lower surface 48 of the tapered portion of rod 42 has been driven to its desired penetration, as shown by broken lines in FIG. 7. Alternatively, the tapered portion of rod 42 can be driven to a shallower depth as shown in solid outline in FIG. 7. The user of the present invention can select the desired depth of penetration into meat 20 and thereby adapt the present invention to use with meats of varying thickness, as well as provide for deposition of seasoning in the same mass of meat at varying depths. Moreover, it is possible to inject a double quantity of seasoning at the same location on a sample of meat by repeating the procedure through insertion of the tapered portion of rod 42 at the same point of insertion, but at different depths of insertion. Retraction of tube 26 has occurred in FIG. 8, allowing contact with meat 20 of the seasoning in the region above the tapered portion of rod 42. In the final step of withdrawal of the meat-piercing rod, shown in FIG. 9, tube 26 is drawn upwardly to the configuration of FIG. 5, and a new supply of seasoning from reservoir 36 can then pass through passageway 52 and opening 38 into the region 54 above the upper surface 40 of the tapered portion of rod 42. Upward withdrawal of the tapered portion of rod 42 results from engagement of retaining pin 46 at the upper end of slot 44 under urging from compressed spring 34, causing rod 42 and tube 26 to move upwardly in unison while the seasoning is forced laterally into meat 20 by the upper surface 40 of the tapered portion of rod 42.

Seasoning device 22 can be assembled in the following manner, reference being had particularly to FIG. 2 and FIG. 4. Spring 34 is placed around tube 26 and tube 26 is inserted into body portion 28. Rod 42 is then inserted from the bottom of tube 26 through opening 50 and moved upward until slot 44 is in alignment with holes 60 and 62 of tube 26. Spring 34 is slightly compressed to allow retaining pin 46 to be inserted through hole 60, slot 44, and hole 62. Release of the slight compression on spring 34 causes the entire assembly to be held in place by the slight compression of spring 34 acting upwardly against retaining pin 46. Disassembly of the assembled unit is accomplished by reversing the procedure above. Such disassembly permits easy cleaning of the device after use as well as interchange of reservoirs 36.

This seasoning device and method of operation differs from prior art devices and methods since it allows flow of seasoning from the device only when seasoning is being deposited internally in the meat. The present invention is adapted to use with solid granulated seasoning without plugging up with meat on downward motion of the piercing rod. Seasoning flows from the present invention under the influence of gravity, rather than through application of pressure to force the seasoning into the meat. Consequently, a more even and uniform quantity of seasoning can be deposited, and sharpened tubes to cut off portions of seasoning are unnecessary. Furthermore, the piercing rod of the present invention acts as a seasoning retaining means for closing the opening 50 and preventing spillage or leakage of seasoning when the unit is not being used to season meat.

In a second embodiment of the present invention, illustrated in FIGS. 10 to 13, a trigger type apparatus is shown for internally seasoning meat prior to cooking, constituting a second embodiment of the present invention. FIG. 10 shows the device immediately prior to use, where seasoning is free to flow from reservoir 70 in the direction of the arrow through passageway 72 into channel 74 of rotatable charge wheel 76. Body portion 78 has a cover portion 80 held to body portion 78 by retaining screws 82 and a suitable filler opening (not shown) by which the reservoir can be refilled. Trigger 84 is inserted in charge wheel 76 at recess 86, causing wheel 76 to rotate counterclockwise when trigger 84 is moved toward handle 88, reaching the position shown in FIG. 12. As trigger 84 moves, clip or leaf spring 90 is compressed to exert a constant outward force directing it away from handle 88. Trigger 84 is equipped with channel 92 in which clip sliding surface 94 is free to move outwardly during motion of trigger 84 towards handle 88, and inwardly during the opposite motion of trigger 84. Cut away portion 96 of body 78 determines the extent of movement of trigger 84, which seats upon surface 98 when trigger 84 is extended and the device is not in use.

When tube or barrel 100 is raised to the vertical position of FIG. 10, seasoning from reservoir 70 passes through passageway 72 into bore 74 which is closed at its other end by an adjacent cavity wall. Pivotal movement of trigger 84 toward handle 88 causes counterclockwise rotation of charge wheel 76, closing the connection between passageway 72 and bore 74 and isolating the charge of seasoning in bore 74. In the course of counterclockwise rotation of charge wheel 76, rod 102 connected eccentrically thereto will be displaced downward through downward motion of pivot point 104 on charge wheel 76. Tapered end 108 of rod 102 penetrates into the meat by piercing action of lower surfaces 112 of tapered end 108 and the charge of seasoning contained in bore 74 falls by gravity in the direction of the arrow of FIG. 12 downwardly through tube 100. This embodiment of the device is inserted into the meat in a manner similar to that in FIGS. 6 and 7, that is, with the tube 100 engaged with the tapering upper surface 108 of double conical end on the rod 102 by exerting force on the top portion of handle 88 until the tube and tapered end 112 penetrate to a desired depth. The unit is then slightly withdrawn by a combination motion which squeezes the trigger which discharges the charge of seasoning down through tube 100 against the upper tapered surface of the rod tip 108 which forces it laterally into the meat as the unit is withdrawn from the meat in the same manner as illustrated in FIG. 9. When the tapered end 108 is out of the meat, release of trigger 84 to its original position as shown in FIG. 10, reloads bore 74 of charge wheel 76 and moves rod 102 inwardly in barrel 100. The device is then charged in the configuration of FIG. 10 for repetition of the process.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a device for introducing a composition of flowable seasoning internally into meat, the improvement comprising a piercing tube, a rod enclosed by the tube and tapered means fittable against an end of said tube, the rod being joined at one end to the tapered means, and a body portion being attached around said tube, said tube holding a predetermined quantity of said seasoning and being insertable in unison with said tapered means substantially vertically into said meat, said body portion including a reservoir for holding said seasoning and dispensing therefrom said predetermined quantity of seasoning, said tube being retractable from said meat by longitudinal movement of the tube with respect to said rod, the tapered means being adapted for piercing and penetrating the meat free of problems of plugging the piercing tube and excessive pressure required to force the piercing tube into the meat, whereby said seasoning is introduced into the meat from the piercing tube under the influence of gravity without application of pressure on the seasoning.

2. The device of claim 1 wherein said tapered means has a conical lower surface for piercing said meat and a conical upper surface for deflecting said seasoning internally into said meat, said upper surface being joined at its vertex to said rod.

3. The device of claim 2 wherein said reservoir is removably attachable to said device, whereby the seasoning is selectable from a plurality of seasonings contained in a plurality of reservoirs containing a plurality of different seasonings.

4. The device of claim 3 wherein said tube is embedded in a handle for imparting longitudinal translation thereto, said rod having a slot at the end remote from said tapered means for receiving retaining means attached to said tube for limiting said longitudinal movement.

5. The device of claim 4 together with bias means, said body portion enclosing a section of the length of said tube of from the end of said tube remote from said handle, said retaining means comprising a retaining pin passing through said slot and two diametrically opposed holes in said tube, said bias means urging said upper surface against said end remote from said handle.

6. The device of claim 5 wherein said bias means is a spring under compression enclosing said tube and acting between said retaining pin and said body.

7. The device of claim 1 wherein said body portion houses a rotatable charge wheel having a trigger projectingly attached thereto, said body portion having a handle portion against which said trigger is biased, said charge wheel having a bore for receiving said predetermined quantity of seasoning from said reservoir when unrotated and for discharging said seasoning into said tube upon rotation of said charge wheel, said charge wheel having a periphery along which the end of said rod remote from said tapered means is pivotably attached for longitudinal movement corresponding to charge wheel rotation.

8. The device of claim 7 wherein said reservoir is connected to said bore by a passageway, said trigger is being biased away from said handle portion by a spring clip attached at one end to said handle portion, the other end of said clip sliding in a trough in said trigger, said body portion comprising a body and a cover held to said body by fastening means.

9. The method of operating the device of claim 7 comprising the following steps:
   (a) introducing said composition of seasoning into said reservoir;
   (b) aligning said tube substantially vertically above said meat with said tapered means in contact with said meat;
   (c) applying downward force to said handle to drive said tube in contact with said upper surface;
   (d) applying further downward force on said handle to insert in unison said tube and tapered means into said meat to the desired depth;
   (e) releasing said handle to retract said tube from said meat by said longitudinal movement with respect to said rod;
   (f) further removing said downward force on said handle to retract said tapered means from said meat; and
   (g) retracting said tube upwardly to permit refilling of said tube by said predetermined quantity of seasoning.

10. A method of operating the device of claim 9 comprising the following steps:
   (a) introducing said seasoning into said reservoir;
   (b) aligning said tube substantially vertically with said tapered means contacting said meat;
   (c) applying downward force on said handle portion to insert in unison said tapered means and said tube to the depth desired within said meat;
   (d) rotating said trigger toward said handle portion to discharge the seasoning from the bore into the tube and move the tapered means on the lower end of the rod away from the lower end of the tube to discharge the seasoning laterally toward the meat;
   (e) pulling said tapered means upwardly through said meat to force the seasoning laterally into the meat; and
   (f) releasing said trigger after the device has been completely disengaged from the meat to ready it for another cycle of operation.

11. An apparatus for injecting flowable seasoning material internally of meat comprising a tube receiving a quantity of seasoning, a closure member engaged with the lower end of the tube and retaining the seasoning in the tube during downward insertion into the meat, said closure member having a tapering lower end forming an extension of the tube to facilitate penetration into the meat, said closure member having a tapering upper surface engaged with the lower end of the tube and means associated with the closure member and tube to separate the lower end of the tube and the closure member while internally of the meat for discharge of the seasoning laterally of the closure member by gravity flow of the seasoning onto the tapering upper surface of the closure member, said tapering upper surface of the closure member forcing the seasoning laterally into the meat as the closure member is pulled out of the meat.

12. The apparatus of claim 12 together with a body portion including a reservoir for holding said seasoning and dispensing therefrom said quantity of seasoning, the reservoir having a passageway for introducing seasoning by gravity flow from the reservoir to the region within the lower end of the tube and above the closure member.

* * * * *